United States Patent [19]

Prenosil

[11] Patent Number: 5,023,738
[45] Date of Patent: Jun. 11, 1991

[54] CORROSION RESISTANT MAGNETIC RECORDING READ

[75] Inventor: Michael B. Prenosil, Roseville, Minn.

[73] Assignee: Seagate Technology, Inc., Scotts Valley, Calif.

[21] Appl. No.: 452,689

[22] Filed: Dec. 18, 1989

[51] Int. Cl.$^5$ .............................................. G11B 5/187
[52] U.S. Cl. ..................................... 360/122; 360/103
[58] Field of Search ............................ 360/119–122, 360/125–128, 103

[56] References Cited

U.S. PATENT DOCUMENTS

| | | | |
|---|---|---|---|
| 3,573,768 | 4/1971 | Harris | 340/174.1 |
| 3,665,436 | 5/1972 | Murray et al. | 340/174.1 |
| 3,816,152 | 6/1974 | Yates | 106/287 |
| 3,823,416 | 7/1974 | Warner | 360/122 |
| 3,855,625 | 12/1974 | Garnier et al. | 360/103 |
| 3,887,945 | 6/1975 | Nepela et al. | 360/113 |
| 3,921,217 | 11/1975 | Thompson | 360/113 |
| 3,956,770 | 5/1976 | McWhinnie et al. | 360/103 |
| 4,130,524 | 12/1978 | Boerwindle et al. | 260/29.6 |
| 4,130,847 | 12/1978 | Head et al. | 360/122 |
| 4,190,872 | 2/1980 | Jones, Jr. et al. | 360/125 |
| 4,327,387 | 4/1982 | Plotto | 360/103 |
| 4,467,382 | 8/1984 | Huisman | 360/125 |
| 4,592,963 | 6/1986 | Mukasa et al. | 428/544 |
| 4,610,810 | 9/1986 | Hasegawa et al. | 252/511 |
| 4,614,600 | 9/1986 | Schilling et al. | 252/8.553 |
| 4,623,738 | 11/1986 | Sugarman et al. | 556/17 |
| 4,692,832 | 9/1987 | Bandara et al. | 360/137 |
| 4,750,070 | 6/1988 | Maruyama | 360/113 |

OTHER PUBLICATIONS

L. J. Matienzo, D. K. Shaffer, W. C. Moshier and G. D. Davis, *Organic Corrosion Inhibitors to Improve the Durability of Adhesion Between Aluminum and Polymeric Coatings,* American Chemical Society (1986), pp. 234–249.

T. Szauer and A. Brandt. *Equilibria in Solutions of Amines and Fatty Acids with Relevance to the Corrosion Inhibition of Iron,* 23 Corrosion Science 12 (1983), pp. 1247–1257.

*Primary Examiner*—A. J. Heinz
*Attorney, Agent, or Firm*—Kinney & Lange

[57] ABSTRACT

A magnetic recording head and method for coating a magnetic recording head for use in a computer hard drive head arm assembly is provided. The head is treated with a silane, zirconate or titanate compound for coating magnetic surfaces to prevent atmospheric corrosion. The coating of the present invention protects the head during assembly, transport and storage, and advantageously wears off after repeated hard drive use, restoring the original fly height. The frictional contact between the head and the magnetic recording media keeps the head surfaces polished and corrosion free after the head is in use.

24 Claims, 1 Drawing Sheet

CORROSION RESISTANT MAGNETIC RECORDING READ

BACKGROUND OF THE INVENTION

1. Field of the Invention.

The present invention relates to corrosion resistant magnetic surfaces. In particular, it relates to corrosion resistant magnetic head assemblies of the type used to record and read data, and a method for protecting the exposed magnetic surfaces of the heads.

2. Description of the Prior Art.

Magnetic metal alloys such as permalloy are commonly used as one of the materials for forming magnetic head assemblies used in computer data storage devices. It is known in the art that the magnetic surfaces of magnetic head assemblies are attacked by moisture and chemicals causing corrosion, which reduces the reliability and accuracy of the head, and can lead to total disc drive failure. This corrosion most commonly occurs after manufacture but before use.

Permalloy is a magnetic nickel-iron alloy which has excellent magnetic properties, but which is subject to corrosion. In particular, vaporized water, chlorides and sulfides are known to corrode permalloy. Other magnetic alloys are also susceptible to corrosion.

Magnetic head assemblies typically include a plurality of exposed magnetic surfaces, such as pole tips at or on the air bearing surface of the "flying head" assembly, for example. The air bearing surfaces for purposes of this disclosure are the surfaces of the magnetic recording head which contact the magnetic recording media when the magnetic recording media is not in motion. Frictional contact between the magnetic portions of the air bearing surfaces generated during starting and stopping prevents further corrosion.

The fly height for purposes of this application is defined as the distance between the surface of the magnetic recording media, and the air bearing surface of the magnetic recording head. A coating applied to the air bearing surface of the head increases the fly height, which reduces the signal amplitude. Minimizing the fly height assures that the signal sent to and from the magnetic head has minimum distortion, has the maximum accuracy. The aim of the industry is to achieve a higher density of magnetic transitions in the recording media. This is accomplished in part by reducing fly heights.

Although it is known in the art generally that the air bearing surface of a magnetic head can be coated with a layer of anticorrosive material, it has been undesirable before the present invention, for a variety of reasons, to coat magnetic pole tips in magnetic heads with any substance.

For example, the Head et al U.S. Pat. No. 4,130,847 discloses the application of a thin layer of film applied to the air bearing surface of a transducer, including the pole tips for corrosion and wear protection. The thin layer is preferably formed from chromium. It is known that the application of a layer of coating to the surface of pole tips adversely affects the magnetic properties of the transducer. In particular, the magnetic field is weakened, and the signal generated in the transducer is distorted, compared to a signal generated by a transducer without a pole tip coating.

Plotto U.S. Pat. No. 4,327,387 discloses a magnetic head slider assembly having a body supporting a transducer. The transducer reads and writes information contained in a data carrier. On the surface of the transducer facing the surface of the data carrier is a lubricating layer, preferably formed from an organic monomolecular polar compound. The preferred lubricating layer is formed from methyl ($CH_3$—) groups. The layer is between about 30 and 50 Angstroms in thickness, and increases the fly height by that amount. Increases in fly height are known to decrease the signal amplitude of the transducer.

The aim of the industry is to reduce fly heights as much as possible in order to increase the accuracy of data transfer to and from high density recording media. High density recording media generally spins at a faster rate.

With decreased fly heights, it is imperative that no foreign substances (such as coatings) be present on the transducer surface or the recording media surface which are subject to peeling or flaking. Particulates located between the transducer surface and the recording media are known to cause hard drive crashes. For the above-mentioned reasons, the practice in the industry has been to prevent corrosion in pole tips by using other methods of protection, such as by preventing the exposure of the manufactured heads to corrosive environments.

One known method of preventing corrosion in manufactured magnetic heads includes storing and shipping the heads in contamination-free containers containing a desiccant. Another method includes storage of the component parts in a noncorrosive gaseous environment such as nitrogen. Still another method includes the storage of the magnetic heads in a vacuum-packaged, contamination free container.

Although the use of corrosion inhibiting coatings on magnetic components such as magnetic heads has not been considered desirable before the present invention, the application of corrosion inhibiting chemicals to metal surfaces is well known. For example, the article by Mateinzo et al., *Organic Corrosion Inhibitors to Improve the Durability of Adhesion Between Aluminum and Polymeric Coatings*, 22 American Chemical Society, p. 234 (1986) discloses the use of organosilanes as a corrosion inhibitor/bonding agent for aluminum surfaces. A mercaptosilane was selected as a preferred anticorrosive agent for aluminum.

The above-mentioned prior art references fail to disclose a method of protecting the magnetic surfaces of a magnetic head during the manufacture, storage and shipping of magnetic recording head assemblies. A temporary coating which does not permanently increase fly height, significantly reduces corrosion, does not distort the signal generated by the magnetic recording head, and does not increase the potential for catastrophic hard disc failure would therefore be very desirable.

SUMMARY OF THE INVENTION

The present invention is a magnetic recording head for use in a computer, having at least one transducer surface coated with a protective coating formed from a titanate, zirconate or silane compound. The coating is applied as a last manufacturing step before assembling the head arm assembly. The coating protects the pole tips from corrosion during subsequent manufacturing steps, storage and shipping. When the magnetic recording head is put into use, the wear from contact between the air bearing surface of the head and the surface of the magnetic recording media eventually erodes the coating, leaving a finely polished, contamination free air bearing magnetic surface on the head. The present invention also includes a method of protecting magnetic surfaces from corrosion.

DETAILED DESCRIPTION OF THE PREFERRED EMBODIMENTS

The present invention is a magnetic recording head having a protective coating for preventing corrosion of magnetic surfaces (such as permalloy pole tips) during manufacture, shipping and storage, and a method for coating the surface of a magnetic head to inhibit corrosion. Permalloy is a magnetic iron-nickel alloy having excellent magnetic properties, but is subject to corrosion from substances in the atmosphere such as chlorine, for example. The present invention protects magnetic surfaces such as permalloy before the magnetic recording head is put into operation, but does not distort the signal generated during operation of the head, or permanently increase the fly height of the magnetic recording head. The protective coating of the present invention advantageously wears off during operation of the head.

The present invention protects magnetic heads from failures due to corrosion. As the damage due to environmental corrosion primarily occurs during assembly of the head arms, during shipping, and during storage, the present invention is a magnetic recording head which is protected from corrosion primarily before actual data storage and retrieval is accomplished.

Figure 1:
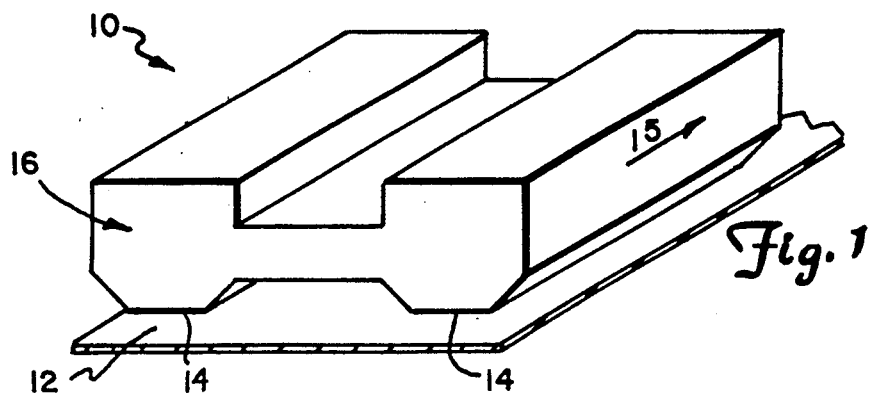
FIG. 1 illustrates a magnetic recording head in combination with magnetic recording media.

FIG. 1 illustrates a magnetic recording head 10 from a head arm assembly of a computer disc drive. The head 10 transmits and receives information to and from the magnetic recording media 12 which moves relative to the air bearing surface 14 in the direction of the arrow 15. Near the trailing end 16 of the head 10 and flush with the air bearing surface 14 is mounted a pair of transducers 18A, 18B (see FIG. 2), each having a plurality of pole tips 20 (see FIG. 3).

Figure 3:
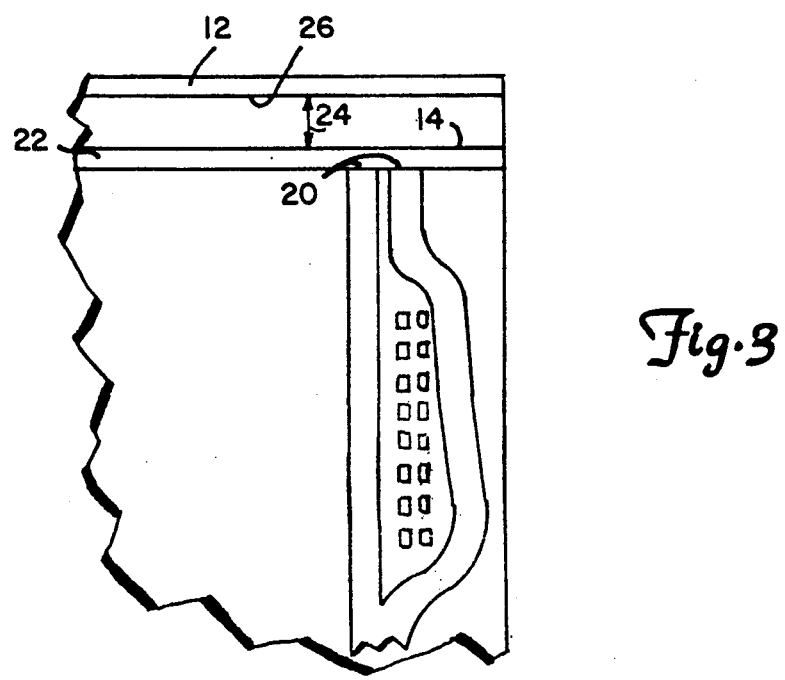
FIG. 3 shows a cross sectional view taken along line 3—3 as shown in FIG. 2, illustrating the coated pole tips of the present invention.

In accordance with the present invention, the pole tips 20 are coated with a chemical compound from the silane, zirconate or titanate groups, forming a removable protective layer 22, illustrated in FIG. 3. In operation (when the head 10 and the magnetic recording media 12 are moving relative to each other) an air gap 24 is formed whose height is commonly referred to as a "fly height." The fly height is established by a self acting hydrodynamic air bearing (not shown) between the head 10 and the recording media 12. The addition of a coating layer 22 to the air bearing surface 14 including the transducers 18A and 18B increases the fly height. However, after the head 10, coated in accordance with the present invention is put into operation, the coating eventually wears off. Thereafter, the abrasion of the air bearing surface 14 between the head 10 and the magnetic recording media 12 prevents further corrosion to the pole tips 20.

Magnetic recording heads are normally contact start/stop (C.S.S.) tested at 2000 revolutions per minute over 20,000 cycles, which is equivalent to seven to ten years of use. If a head is still operational after 20,000 cycles, it is considered durable enough for commercial use. The magnetic recording head of the present invention not only avoided premature hard drive failure, but none of the test specimens failed after 20,000 cycles. The recording heads of the present invention are believed to be even more durable, but were not tested beyond 60,000 cycles.

Figure 2:
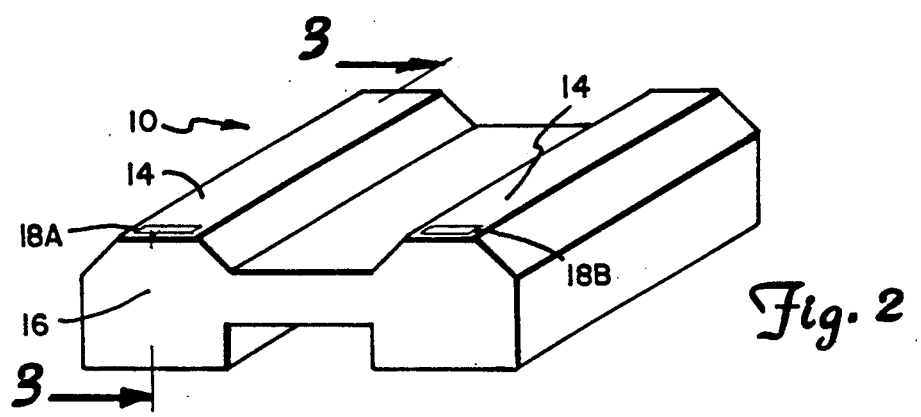
FIG. 2 shows a pair of read/write transducers mounted into the air bearing surfaces of a magnetic recording head.

The magnetic recording head of the present invention is less susceptible to disc drive failure than uncoated magnetic heads. Repeated contact start-stop testing has verified that heads coated with the anticorrosion coating of the present invention are no more susceptible to head crashes than heads that are not coated. It is believed that the coated heads of the present invention have a lower C.S.S. failure rate than uncoated heads. Surprisingly, the coating does not accumulate on the air bearing surface 14 as shown in FIG. 2 as it wears off, and does not cause premature head crashes. It is believed that the coating flows toward the trailing end 16 of the head, as shown in FIG. 2, accumulating on the end 16, and does not flake or peel off.

The coatings employed in the practice of the present invention are silane, titanate or zirconate compounds. The coatings of the examples provided below are organosilanes, organotitanates, organozirconates, and aminosilanes. Although each example shows compounds having organic and/or amine functionality, the present invention includes any titanates, silanes, and zirconates having functional groups (R) capable of hydrolyzing. The compounds of the present invention are hydrolyzed, and react with the hydroxyl groups present on the surface of the permalloy. The compounds are thought to form a strong chemical bond between the oxygen molecule present in the hydroxyl group of the magnetic surface and the silicon, titanium, or zirconium atom of the selected compound.

Surprisingly, coatings formed from hydrolysed titanate, zirconate or silane compounds do not adversely affect the magnetic properties of the magnetic heads 10. There are also no known adverse effects on the magnetic properties of the heads by applying an anticorrosive coating of the present invention.

Although the most preferred examples of the coating materials of the present invention have four functional groups (i.e. Ti(R)$_4$), coating compounds with fewer functional groups also form suitable coatings. The following examples show that compounds having three or more functional groups generally produce better coatings than compounds having one or two reactive groups. Silanes were found to form the most preferred coating. The silanes not only provide an excellent corrosion barrier, but the compounds advantageously have antistatic properties. An antistatic pole tip is much less likely to attract dust and other particulates which increase the susceptibility of the magnetic head to catastrophic failure, and read/write errors.

In order to prepare a magnetic recording head of the present invention, a compound from the silane, zirconate, or titanate groups is selected. The compound preferably has three or four reactive functional groups (R) which readily hydrolyze upon the addition of water according to the following reaction:

$$Ti(R)_4 + 4H_2O \rightarrow Ti(OH)_4 + 4RH$$

An amount of the selected compound is dissolved in a carrier solvent, such as isopropanol, for example. Next, a small amount of water is added to the mixture to hydrolyze the selected compound. The purpose of the hydrolyzation step is to replace the functional groups from the selected compound with —OH (hydroxyl) functional groups which condense with the hydroxyl groups on the metallic surface and release water molecules. The following equation illustrates this reaction:

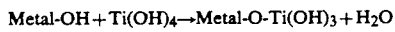

Metal-OH + Ti(OH)$_4$ → Metal-O-Ti(OH)$_3$ + H$_2$O

Hydrolyzation typically occurs within a few minutes of adding water to the selected compound and solvent mixture. It is preferred that the solution be allowed to stand for a period of about one hour for titanates, zirconates and silanes. The prepared solutions of the present invention are known to have a shelf life of at least two weeks, and therefore the solutions can be prepared well in advance of coating the magnetic recording heads.

Before the magnetic head is coated with the prepared solution, it is first cleaned by means known in the art such as by plasma etching, or by immersion in an ultrasonic bath containing Freon TMS solvent, for example. Freon TMS is available from the E. I. Du Pont de Nemours Co., Wilmington, Del. The preferred cleaning process is by a plasma etch method.

The next step in forming a corrosion resistant magnetic recording head is to apply the prepared solution to the head 10. The most preferred method of application includes dipping the trailing end 16 far enough into the solution such that the exposed surfaces of the transducers 18A and 18B are immersed. Although the amount of exposure time depends in part on the wetting effect of the solution, a preferred exposure time of about two minutes is adequate to assure that the majority of the hydroxyl groups (—OH) present on the magnetic surface have reacted with the titanium, zirconium or silicon molecules. The following equation illustrates this reaction:

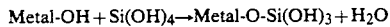

Metal-OH + Si(OH)$_4$ → Metal-O-Si(OH)$_3$ + H$_2$O

Although the preferred exposure time is approximately 2 minutes, exposure times of up to about 10 minutes are sometimes necessary to achieve an adequate reaction. With other compounds, as little as 2 seconds is required to achieve an adequate reaction.

Although the most preferred method of application of the solution is by dipping, other preferred methods such as spraying are also suitable. For example, a fine spray generated by an ultrasonic nozzle is a suitable method of applying a uniform thin film of coating to the exposed surfaces of the transducers 18A and 18B. Another preferred method of applying the solution is by vapor deposition.

The protective layer of the present invention is typically about two molecules thick, and therefore it is critical to obtain a uniform layer in order to adequately inhibit corrosion. If the dipping method is used, care must be taken to drain off any excess solution, and to avoid drop formation near the transducers 18A and 18B. Because it is desirable to minimize the fly height, a coating of the minimum thickness which still adequately inhibits corrosion is desirable. In the preferred embodiment, the final coating thickness is between about 10 and about 50 Angstroms, with a preferred range of between about 20 and about 30 Angstroms. In order to assure that the protective layer 22 as shown in FIG. 3 is adequately thin, the solution must be uniformly applied, and drops near the pole tips 20 should be avoided.

The carrier solvent is allowed to evaporate after the application of the solution. In the preferred embodiment, the magnetic head is dried under ambient conditions until all of the volatile components such as solvents and organic reaction by-products vaporize. Typically, this step takes between about 2 seconds and about 10 minutes. The preferred drying time at ambient temperature is about five minutes.

The next step in forming the magnetic head of the present invention is to bake the coated head in an oven to drive the reaction on the surface of the permalloy toward completion, and to aid in cross-linking between the molecules of the titanate, zirconate or silane compounds. The head is baked at a temperature of between about 150 degrees Fahrenheit and 300 degrees Fahrenheit for between about a minute and about 2 hours. The most preferred baking conditions are at 225 degrees Fahrenheit, for about two minutes at atmospheric pressure. Alternatively, baking parameters of about two minutes at 150 degrees Fahrenheit are also suitable. Another preferred set of baking conditions includes lowering the pressure slightly and lowering the baking temperature. Magnetic recording heads are subject to damage due to excessive heat exposure, and the temperature and exposure times are determined in part by the construction and durability of the magnetic recording head.

After the coated magnetic head has been baked, it is cooled to room temperature and cleaned with the solvent used to form the solution, which in the preferred embodiment is isopropanol. Although the preferred solvent is isopropanol, the solvent may be any volatile liquid which does not interfere with forming the coating of the present invention. For example, methanol, ethanol and toluene are examples of other suitable solvents. The magnetic head 10 is placed in an ultrasonic bath of the solvent, and cleaned for between about 1 minute and about 5 minutes, with a preferred cleaning time of about 2 minutes. The head 10 is then removed from the bath, rinsed again with fresh solvent and then air-dried. The head 10 is then ready for installation into a head-arm assembly, or for packaging.

Although the preferred coating method includes the application of an anticorrosive coating to the entire trailing end 16 of the magnetic head 10, it is only necessary to protect the pole tips 20. The solution of the present invention may be applied to the entire surface of the magnetic head 10, to the air bearing surfaces 14, the surfaces of the transducers 18A, 18B, or to the pole tips 20 alone (see FIG. 3).

In order to better understand the magnetic recording head and method of protecting a recording head of the present invention, a number of illustrations are provided.

EXAMPLE 1

A 94:2:4 weight ratio solution was prepared by measuring a quantity of isopropanol, and adding to it a quantity of 1,3 aminopropyl-triethyoxysilane. To the mixture was added deionized water. The solution was well mixed and allowed to stand for approximately three hours. A magnetic recording head was prepared by cleaning the outer surfaces by a plasma etch method. The trailing edge 16 was dipped into the solution, and was immersed for a period of about two minutes. The edge 16 was then removed from the solution, and allowed to drip dry. Care was taken to avoid the formation of drops of solution on the exposed surfaces of the transducers 18A, 18B. The component was permitted to air dry for approximately five minutes, then heated for two minutes at a temperature of 150 degrees Fahrenheit for an additional two minutes. The head was removed from the oven, cooled for approximately ten minutes, then washed in an ultrasonic bath for two minutes in isopropanol. The head was rinsed again with fresh isopropanol and allowed to air-dry. The above example produced a highly acceptable coating for protecting the pole tips 20 of the head.

EXAMPLE 2

A 94:2:4 weight ratio coating solution was prepared by adding a quantity of 3 mercaptopropyltrimethoxysilane to isopropanol. A quantity of deionized water was added, and the mixture was well mixed and allowed to react for a period of about three hours. A magnetic head was prepared by cleaning the surfaces by a plasma etch method. The trailing end 16 was dipped into the solution, and immersed for a period of approximately two minutes. The head 10 was then removed, air dried for a period of about five minutes, and then baked for two minutes at about 225 degrees Fahrenheit. The head 10 was cooled to ambient temperature, washed with isopropanol in an ultrasonic bath for two minutes and then rinsed again with fresh isopropanol.

The coating produced in this example produced a suitable, though somewhat less desirable coating than in Example 1. The silane compound selected had a very strong odor, and offered less corrosion protection than the coatings of each of the other examples.

EXAMPLE 3

A 94:2:4 weight ratio solution was prepared by adding a quantity of neopentyl(diallyl)oxy,tri(dioctyl)pyrophosphato zirconate to isopropanol. Then, deionized water was added. The solution was mixed thoroughly and allowed to stand for a period of about one hour. A magnetic head was prepared by cleaning the surfaces by a plasma etch method. The trailing end 16 was dipped into the above solution, and immersed for a period of about two minutes. The head 10 was then removed from the solution and allowed to air dry for about five minutes, and was baked for about two minutes at a temperature of about 225 degrees Fahrenheit. The coated head was cooled to room temperature, washed with isopropanol in an ultrasonic bath for about two minutes, rinsed with fresh isopropanol and allowed to air dry.

The zirconate coating above produced a good corrosion barrier on the surface of the magnetic head.

EXAMPLE 4

A 94:1:5 weight ratio solution was prepared by adding a quantity of KR238M-Titanate (a methacrylate functional amine of di(dioctyl)pyrophosphato ethylene titanate) to isopropanol. KR238M is a product of the Kenrich Petrochemical Company, Bayonne, N.J. A quantity of deionized water was added, and the solution was well mixed. The solution was allowed to stand for about an hour to allow the KR238M to hydrolyze. A magnetic reading head was plasma etched to clean the surfaces, and then completely immersed in the solution. After a period of about two minutes, the head was removed from the solution, and allowed to air dry for approximately five minutes. The head was baked in an oven for about two minutes at about 225 degrees Fahrenheit, cooled to room temperature, and washed with isopropanol in an ultrasonic bath for about two minutes, followed by a fresh isopropanol rinse.

The magnetic recording head of this example produced a very good anticorrosive layer on the outer surfaces, but most importantly adequately protected the exposed pole tip surfaces 20 as shown in FIG. 3 from corrosion.

EXAMPLE 5

A 94:2:4 weight ratio solution was prepared by adding a quantity of dimethoxymethylsilypropyl substituted polyethylenimine (PSO 76.5 polymeric silane, available from Huls America, Inc. of Bristol, Pa.) to isopropanol. A quantity of deionized water was added, and the solution was well mixed. The solution was allowed to stand for a period of about one hour until adequate hydrolysis occurred.

A magnetic recording head was prepared by cleaning the outer surfaces by a plasma etching method. The head was completely immersed in the above prepared solution and allowed to stand for a period of approximately two minutes. The head was taken out of the solution, and allowed to air dry for about two minutes. Special care was taken to avoid drop formation on the exposed surfaces of the transducers 18A and 18B, as shown in FIG. 2.

The head was baked for about two minutes at about 150 degrees Fahrenheit, and then cooled to room temperature. The head was washed in an ultrasonic bath containing isopropanol for about two minutes, followed by a fresh isopropanol rinse.

The magnetic recording head of this example produced a marginally acceptable anticorrosive coating. It was noted by this example that the polymeric compound did not produce a coating which was thin enough, and that offered as good corrosion resistance as the other examples.

EXAMPLE 6

A 94:1:5 weight ratio solution was prepared by adding a quantity of isopropyltri(dioctyl) pyrophosphato titanate to isopropanol. A quantity of deionized water was then added. The mixture was well stirred, and allowed to stand for about one hour. The surfaces of a magnetic recording head were cleaned by a plasma etch method. The trailing end 16 of the magnetic recording head 10 was dipped into the solution, and immersed for a period of approximately two minutes.

The head 10 was removed from the solution, and allowed to air dry for a period of approximately five minutes. The head 10 was then baked for about two minutes at about 225 degrees Fahrenheit, and then cooled to ambient temperature. The cooled head 10 was then washed for about two minutes with isopropanol in an ultrasonic bath, followed by a fresh isopropanol wash.

The solution used in this example produced an acceptable corrosion resistant magnetic recording head.

EXAMPLE 7

A solution containing 90 weight percent isopropanol and 10 weight percent of the solution described in Example 1 was mixed and allowed to stand for approximately one hour. A head 10 was prepared by cleaning the surfaces using an ultrasonic cleaning chamber containing Freon TMS, available from the E. I. Du Pont de Nemours Co., Wilmington, Del., for about two minutes. The trailing end 16 of the head 10 was immersed in the solution for about ten minutes, and then air dried for about five minutes. The head 10 was baked for about two minutes at about 225 degrees Fahrenheit, and then allowed to cool to ambient temperature. The head 10 was washed for about two minutes with isopropanol in an ultrasonic bath, rinsed with fresh isopropanol and allowed to air-dry before packaging and or assembly. The solution of this example produced a magnetic recording head having very good corrosion resistance.

EXAMPLE 8

A solution of 90 weight percent isopropanol and 10 weight percent of the solution described in Example 7 was mixed and allowed to stand for a period of approximately three hours, until the silane compound was hydrolyzed. A magnetic recording head 10 as shown in FIG. 1 was cleaned with an ultrasonic cleaner containing Freon TMS, available from the E. I. Du Pont de Nemours Co., Wilmington, Del., for a period of approximately two minutes. The head 10 was then immersed in the solution for a period of approximately two minutes. The head 10 was then removed and air dried for about five minutes, with special care taken to avoid the accumulation of droplets near the transducers 18A and 18B.

The head 10 was baked in an oven for about two minutes at about 225 degrees Fahrenheit, and allowed to cool to room temperature. Then, the head 10 was washed in isopropanol for about two minutes in an ultrasonic bath, was rinsed with isopropanol and then allowed to air-dry. The coating of this example provided some corrosion resistance, but formed a thinner coating which was less corrosion resistant than the coatings of the other examples.

The magnetic recording heads in the above examples were tested for corrosion resistance in a Bethell testing chamber, and then visually inspected under a microscope for signs of corrosion. The preferred corrosion test includes exposure of the heads 10 at about 30 degrees Centigrade and about 70 percent relative humidity to an air atmosphere containing about 10 parts per billion chlorine molecules, about ten parts per billion hydrogen sulfide molecules, and about 100 parts per billion nitrous oxide molecules. An exposure time of about 8 hours produces a rate of corrosion which approximates three to four months of atmospheric corrosion.

According to the corrosion tests performed on the heads 10 of the above examples, each coating reduced the amount of pole tip corrosion considerably. The coatings were very thin and did not significantly increase fly heights. The coatings advantageously protected the pole tips during assembly, storage and shipping, and then wore off during hard drive use, which restored the fly heights to the pre-coating fly height. Abrasion from contact between the air bearing surface 14 of the head 10 and the air bearing surface 14 of the magnetic recording media 12 prevented further corrosion.

Although the present invention has been described with reference to the preferred embodiments, workers skilled in the art will recognize that changes may be made in form and detail without departing from the spirit and scope of the invention.

What is claimed is:

1. A magnetic head comprising:
a pair of magnetic poles having pole tips with a spacer therebetween, the pole tips having end surfaces which face a magnetic medium when the magnetic head is in use; and
a protective coating over the pole tip end surfaces for inhibiting corrosion of the end surfaces, the protective coating including a compound selected from the group consisting of silanes, titanates, and zirconates.

2. The magnetic head of claim 1 wherein the selected compound is 1,3 aminopropyl-triethyoxysilane.

3. The magnetic head of claim 1 wherein the compound is selected from a group consisting of organosilanes, aminosilanes, organotitanates, and organozirconates.

4. The magnetic head of claim 1 wherein the compound has a reactive group which is replaced by a hydroxyl (—OH) group upon contact with water.

5. The magnetic head of claim 1 wherein the selected compound is mercaptopropyl trimethoxysilane.

6. The magnetic head of claim 1 wherein the selected compound is neopentyl(diallyl)oxy, tri(dioctyl)pyrophosphato zirconate.

7. The magnetic head of claim 1 wherein the selected compound is a methacrylate functional amine of di(dioctyl) pyrophosphate ethylene titanate.

8. The magnetic head of claim 1 wherein the selected compound is dimethoxymethylsilypropyl substituted polyethylenimine.

9. The magnetic head of claim 1 wherein the selected compound is isopropyltri(dioctyl)pyrophosphato titanate.

10. A method of forming a corrosion inhibiting protective layer on a surface of a magnetic head, including:
contacting the surface with a solution which includes a compound of the formula:

where X is Si, Ti, or Zr, and R is a functional group that is removed by hydrolysis; and
causing the compound to bond to the surface to form a protective layer.

11. The method of claim 10 wherein the solution is substantially uniformly applied to the surface.

12. The method of claim 10 wherein the step of causing the compound to bond comprises curing the compound by heating the magnetic head after contacting the surface with the solution.

13. The method of claim 12 wherein the magnetic head is heated for between about one minute and about three minutes at between about 150 to about 225 degrees Fahrenheit.

14. The method of claim 10 wherein the step of causing the compound to bond comprises curing the compound by lowering the pressure and by heating the magnetic head after contacting the surface with the solution.

15. The method of claim 10 including the use of a spray apparatus having an ultrasonic nozzle, wherein the step of contacting the surface with a solution comprises spraying the solution through the ultrasonic nozzle to form a substantially uniform protective layer.

16. The method of claim 10 wherein the surface comprises a plurality of permalloy pole tips.

17. A method of protecting a magnetic head from corrosion comprising the following steps:
   providing a solution which includes a hydrolyzable silane, zirconate or titanate compound; and
   applying the solution to a surface of the magnetic head to form a protective layer.

18. The method of claim 17 wherein the solution comprises between 0.04 and about 5 weight percent deionized water.

19. The method of claim 17 and further comprising a step of heating the magnetic head after applying the solution for curing the protective layer.

20. The method of claim 19 wherein the temperature of heating is between about 150 degrees Fahrenheit and about 225 degrees Fahrenheit, and the duration of heating is between about one minute and about three minutes.

21. The method of claim 17 wherein the solution comprises between about 0.02 and about 2.0 weight percent silane, zirconate or titanate compound.

22. The method of claim 17 wherein the step of providing a solution comprises selecting a compound, mixing the compound with a quantity of solvent and a quantity of water, and allowing the solution to stand until the compound is substantially hydrolyzed.

23. A magnetic head comprising:
   at least one magnetic transducer comprising two or more pole tips having end surfaces which face a magnetic medium when the magnetic head is in use; and
   a protective coating on each pole tip end surface, formed from a solution which includes a silane, zirconate, or titanate compound.

24. The magnetic head of claim 23 wherein the protective coating is formed from an organosilane, aminosilane, organotitanate, or an organozirconate compound.

* * * * *